R. LOHSE.
LIQUID METER.
APPLICATION FILED JULY 11, 1910.

990,208

Patented Apr. 18, 1911.

Witnesses:
E. J. Williams
Chas. L. Griestauer

Inventor:
Richard Lohse
by Everett Dufour
atty

UNITED STATES PATENT OFFICE.

RICHARD LOHSE, OF BRESLAU, GERMANY.

LIQUID-METER.

990,208.  Specification of Letters Patent.  Patented Apr. 18, 1911.

Application filed July 11, 1910. Serial No. 571,457.

*To all whom it may concern:*

Be it known that I, RICHARD LOHSE, engineer, a German subject, residing at No. 77–81 Siebenhufenerstrasse, Breslau, Germany, have invented new and useful Improvements in Liquid-Meters, of which the following is a specification.

My invention relates to liquid-meters comprising a Woltmann's sail-wheel.

In water-meters comprising Woltmann's sail-wheels it has been found in practice, particularly for measuring dirty water or liquids carrying sediment, suspended matter and floating matter, that it is necessary to be able to inspect the bearings of the sail-wheel and gearing without having to remove for this purpose either the cylindrical casing of the meter surrounding the vanes or, indeed, the wheel box or the entire measuring apparatus from the section of the pipe or conduit.

Now a primary object of my invention is to provide that, while completely avoiding a special casing for the sail-wheel, it is possible to remove the wheel with its bearings in an exceedingly simple manner, and in a short time, and to make the prime cost of such a meter as small as possible, and to remove solely the parts requiring inspection, as the vanes, bearings and gearing.

One illustrative embodiment of my invention is represented by way of example in the accompanying drawing, wherein:—

Figure 1:
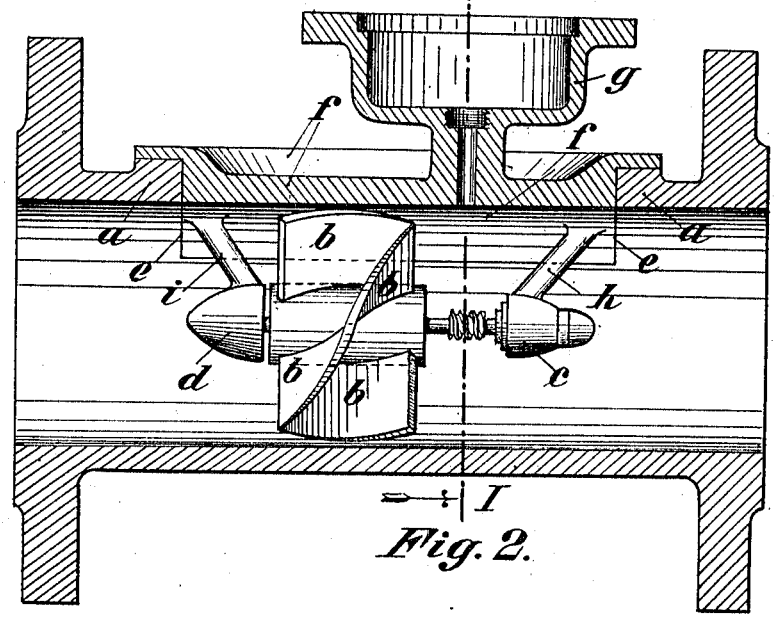
Figure 2:
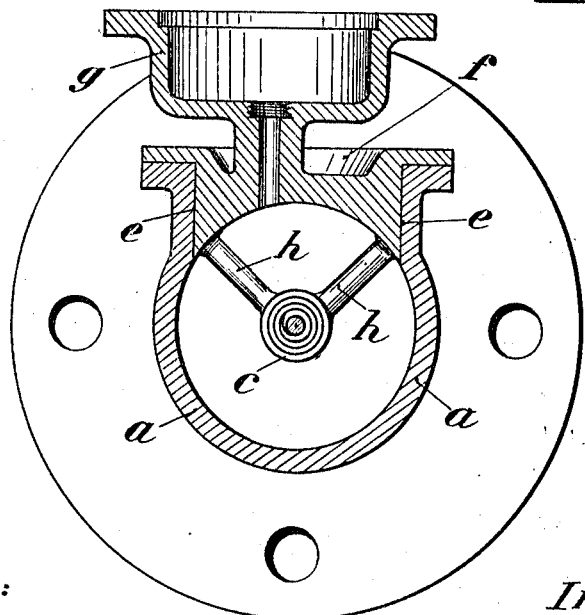

Figure 1 is a longitudinal section showing the parts of my improved liquid-meter requisite for disclosing the invention, and Fig. 2 is a vertical section on the plane I—I in Fig. 1.

Referring to the drawing, $a$ designates the meter casing and $b$ the Woltmann's sail-wheel which is well-known *per se* and rotates in bearings $c$, $d$. I provide in the casing $a$ an inspection hole $e$ which can be closed by the cover $f$ supplementing the casing. The cover $f$ serves simultaneously for carrying the box or casing $g$ for accommodating the indicating or register mechanism, also for carrying the bearing-brackets $h$, $i$ which may be integral with the cover if desired.

Obviously, immediately after the holding members of the cover have been detached, the entire meter together with the sail-wheel and its bearings can be at once removed together, cleaned at once if necessary, made ready for operation again and replaced again into the casing of the meter.

The casing of the meter may consist of optional material, such as bronze, cast-iron or the like, and may also be coated *e. g.* within with an optional suitable coating of paint, enamel or the like.

I claim:—

A device of the character described, comprising a tubular member having an inspection opening, a closure for said opening, forming a segment of said tubular member, with a lateral extension overlying and resting upon said tubular member, said segment-formed closure having an upstanding and open upper ended box, with a central passage through its bottom opening into the interior of said tubular member, and said closure having integral depending bearings within said tubular member, a shaft received by said bearings at its ends, a spirally bladed wheel upon said shaft, said shaft having a quick-screw-thread turned thereon laterally of said wheel and in alinement with the central passage of said outside box.

RICHARD LOHSE.

Witnesses:
LOM WIDTZ,
ERNST BLEISCH.